G. S. BEEMER.
MOWING MACHINE.
APPLICATION FILED NOV. 20, 1914.

1,133,085.

Patented Mar. 23, 1915.
2 SHEETS—SHEET 2.

Inventor
George S. Beemer
By Max A. Schmidt
Attorney

Witnesses
Einar Larson
A. R. Walton they can be readily raised or lowered, and also tilted forward or back.
UNITED STATES PATENT OFFICE.

GEORGE S. BEEMER, OF MEEKER, COLORADO.

MOWING-MACHINE.

1,133,085. Specification of Letters Patent. Patented Mar. 23, 1915.

Application filed November 20, 1914. Serial No. 873,146.

*To all whom it may concern:*

Be it known that I, GEORGE S. BEEMER, a citizen of the United States, residing at Meeker, in the county of Rio Blanco and State of Colorado, have invented certain new and useful Improvements in Mowing-Machines, of which the following is a specification.

The present invention has reference to mowing machines, and its object is to provide a machine of this kind in which the parts are so constructed and arranged that wear is reduced to a minimum, and also to provide a machine which is simple and economical in construction.

With this object in view, the invention consists in a novel combination and arrangement of parts to be hereinafter described and claimed, and in order that the invention may be better understood, reference is had to the accompanying drawings, in which,—

Figure 1:
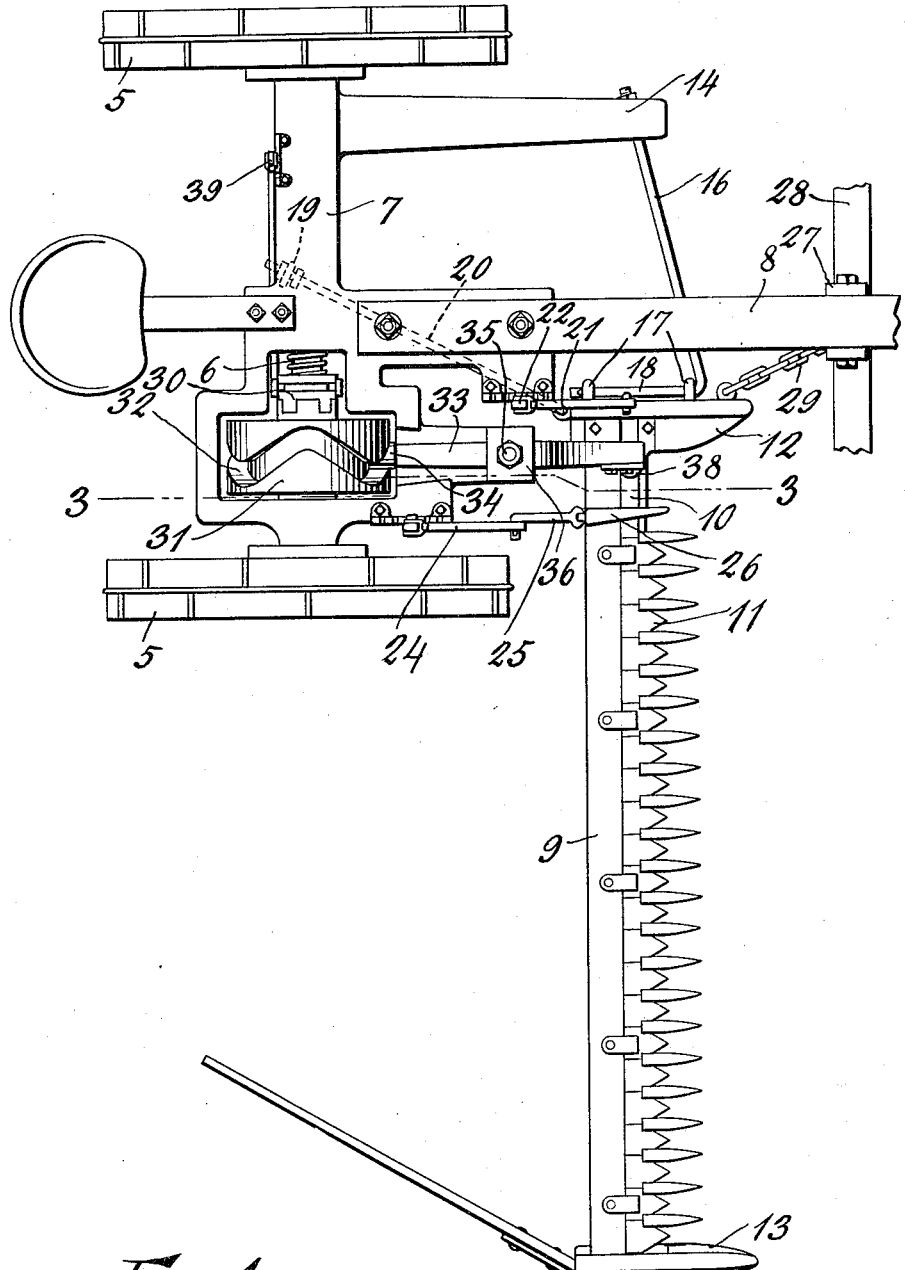
Figure 2:
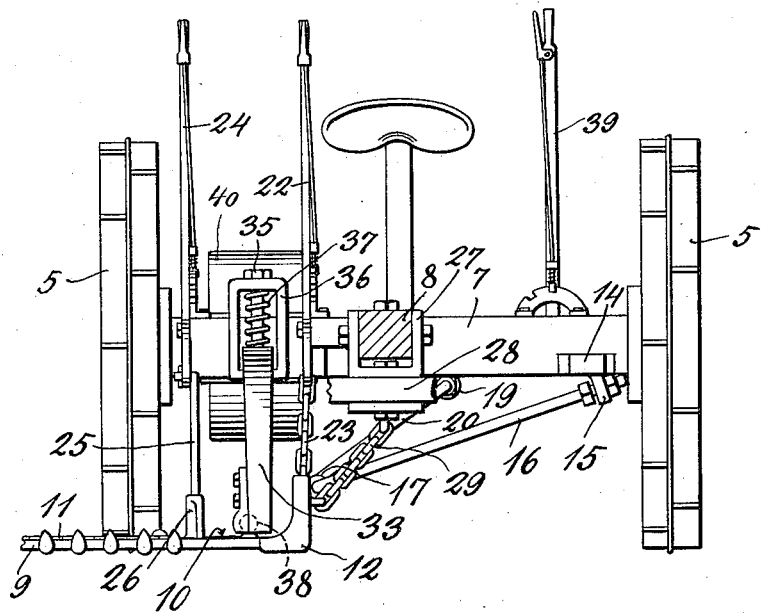
Figure 3:
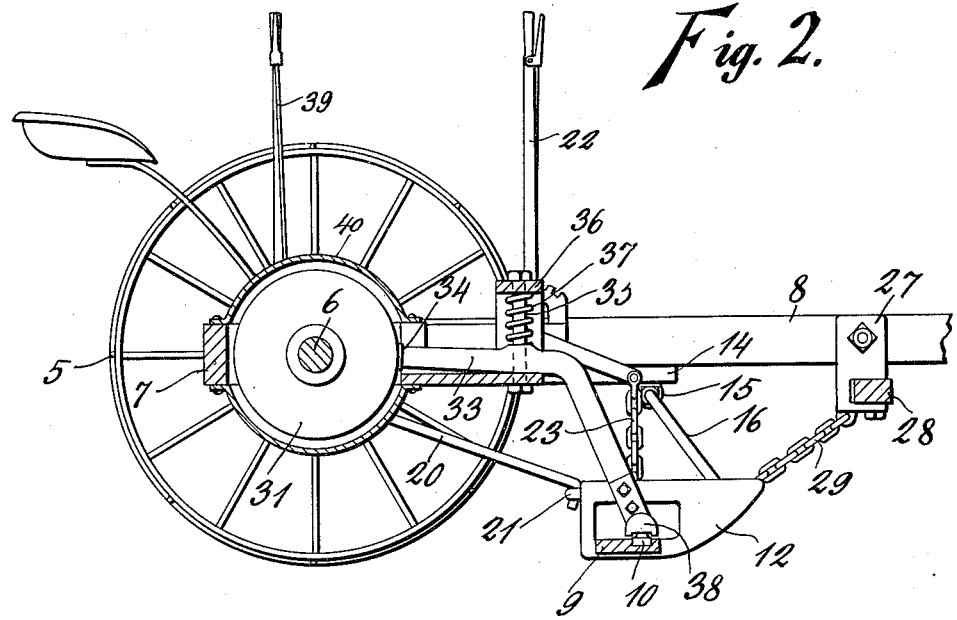

Figure 1 is a plan view of the machine; Fig. 2 is a front elevation thereof, and Fig. 3 is a section on the line 3—3 of Fig. 1.

In the drawings, 5 denotes the drive or supporting wheels of the machine, the same being mounted on an axle 6, which latter supports the main frame 7 of the machine in the ordinary manner. To the main frame is attached a draft tongue 8.

The cutting mechanism of the machine comprises a finger bar 9, and a reciprocatory cutter bar 10 carrying the usual V-shaped knives 11, and provided at its ends with shoes, the inner shoe being shown at 12 and the outer shoe at 13. The cutting mechanism is also provided with a grass board and the other usual appurtenances.

The cutting mechanism is mounted in front of the machine, the following supporting devices being provided: To an arm 14 extending forward from the main frame 7 is swiveled and slidably connected, as indicated at 15, a rod 16 which extends laterally and downward, and is connected at its outer end to the inner shoe 12, said shoe having on its inner side eyes 17 through which loosely passes the rearwardly bent extremity 18 of the rod. The rod provides a flexible suspension for the cutting mechanism, so that the latter may be raised and lowered, and also tilted forward and back.

To the under side of the rear portion of the main frame is swiveled and slidably connected, as indicated at 19 a supporting rod 20 which extends forward and is connected to the rear end of the shoe 12, the connection 21 being a swiveling one, so that no binding will occur when the cutting mechanism is raised, lowered or tilted.

The means for elevating the cutting mechanism is a hand lever 22 connected by a chain 23 to the inner shoe 12. The means for tilting the cutting mechanism is a hand lever 24 connected by a link 25 to a bracket 26 on the finger bar 9, near the inner end thereof. The hand levers 22 and 24 are suitably supported on the main frame 7, and they are provided with the usual latches or locking devices.

By supporting the cutting mechanism as described and providing the hand levers 22 and 24, the finger bar 9 and the parts carried thereby can be readily raised or lowered bodily, and also tilted forward or back.

The tongue 8 carries a support 27 for the draft tree 28, said support being connected to the shoe 12 by a chain 29.

The following operating means for the cutting mechanism are provided: To the axle 6 is connected, by means of a suitable clutch mechanism 30, a cam disk 31 having in its periphery a continuous serpentine cam groove 32. A lever 33 is connected at one end to the inner end of the cutter bar 10, and has its other end extending into the cam groove 32, said last-mentioned end of the lever being provided with a roller 34 to reduce friction. The lever is fulcrumed intermediate its ends on a vertical pin 35 carried by a bracket 36 on the main frame 7, said bracket having vertically spaced parts between which the lever works. Between the top one of the vertically spaced parts and the lever, a spring 37 is coiled around the pivot pin 35. The lever is free to slide on the pivot pin in order that it may follow the cutting mechanism when the latter is raised or lowered. The tension of the spring is just enough to hold the lever down, but not enough to prevent the lever from rising when the cutting mechanism is elevated.

The connection between the lever 33 and the cutter bar 10 is made by a ball-and-socket joint 38, so that the parts will not bind when the cutting mechanism is tilted as hereinbefore described. The forward end of the lever has a downward bend which terminates above the inner end of the cutter bar, so that the connection with the latter may be made at this point.

The clutch mechanism 30 is provided with a suitable controlling lever 39.

In operation, the rotation of the disk 31, through the cam groove 32, oscillates the lever 33, and as the lever is connected to the cutter bar 10, the latter is reciprocated. The lever swings transversely of the machine, and it is connected directly to the cutter bar, a pitman or other connection being dispensed with. The structure is therefore greatly simplified, and the number of parts is reduced to a minimum.

While the preferred structure has been illustrated and described, it will be evident that many changes and modifications may be made without a departure from the spirit and scope of the invention as claimed hereinafter. The disk 31 may be provided with a housing 40 as shown in Figs. 2 and 3.

I claim:

1. In a mowing machine, a main frame, a reciprocatory cutter bar, means for supporting the cutter bar to permit raising and lowering thereof, a lever operatively connected to the cutter bar, a fulcrum for the lever carried by the main frame, on which fulcrum the lever is slidable vertically, and actuating means for the lever.

2. In a mowing machine, a main frame, a reciprocatory cutter bar, means for supporting the cutter bar to permit raising and lowering thereof, a lever operatively connected to the cutter bar, a fulcrum for the lever carried by the main frame, on which fulcrum the lever is slidable vertically, resilient means opposing the upward sliding movement of the lever, and actuating means for the lever.

3. In a mowing machine, a main frame, a reciprocatory cutter bar, means for supporting the cutter bar to permit raising and lowering thereof, a lever operatively connected to the cutter bar, a vertical pivot pin on which the lever is fulcrumed and slidable, and actuating means for the lever.

4. In a mowing machine, a main frame, a cutting mechanism including a finger bar having a shoe at its inner end, and a cutter bar, a supporting rod for the finger bar slidably and swivelingly connected at one end to the main frame, and extending laterally to the shoe and pivotally connected thereto, a lever carried by the main frame to swing transversely thereof, a loose connection between the lever and the cutter bar, a fulcrum for the lever on which it is vertically slidable, and actuating means for the lever.

In testimony whereof I affix my signature in presence of two witnesses.

GEORGE S. BEEMER.

Witnesses:
 CHAS. M. THOMPSON,
 ROBERT J. KYLE.

Copies of this patent may be obtained for five cents each, by addressing the "Commissioner of Patents Washington, D. C."